D. H. DEERY.
RESILIENT TIRE FOR TRUCKS.
APPLICATION FILED JUNE 11, 1912.
1,077,683.
Patented Nov. 4, 1913.
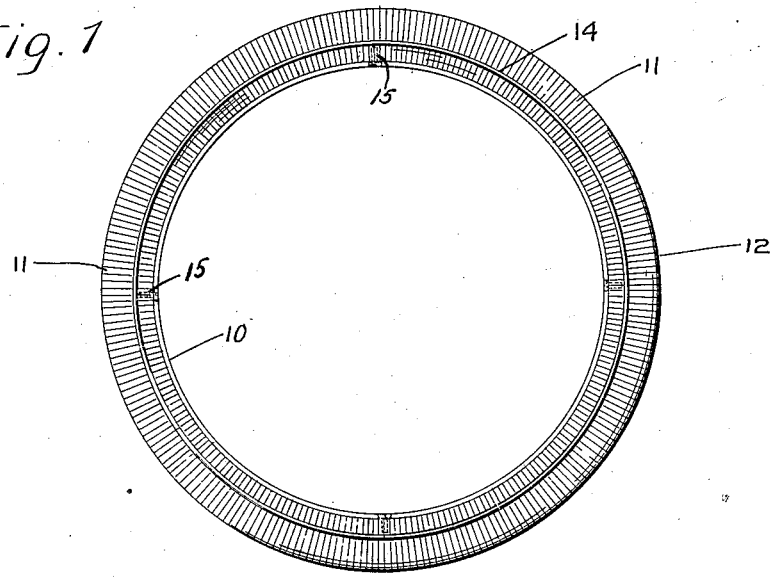
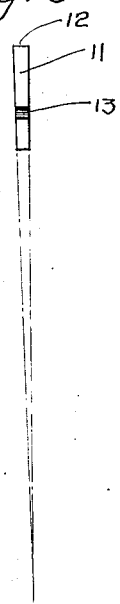
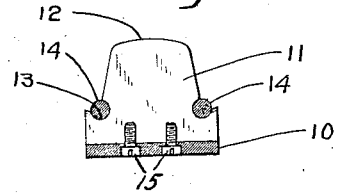
WITNESSES:
INVENTOR
Daniel H. Deery
BY
ATTORNEY

UNITED STATES PATENT OFFICE.

DANIEL H. DEERY, OF BRIDGEPORT, CONNECTICUT.

RESILIENT TIRE FOR TRUCKS.

1,077,683.  Specification of Letters Patent.  Patented Nov. 4, 1913.

Application filed June 11, 1912. Serial No. 703,047.

*To all whom it may concern:*

Be it known that I, DANIEL H. DEERY, a citizen of the United States, residing at Bridgeport, county of Fairfield, State of Connecticut, have invented an Improvement in Resilient Tires for Trucks, of which the following is a specification.

This invention has for its object to provide a relatively inexpensive and extremely durable resilient tire for heavy vehicles, especially trucks. The requirements are a tire with a non-metallic tread that will stand the pounding of heavy loads upon a rough roadway, for a long period of time and without changes or repairs and which may be produced to sell at a relatively low price. It is of course well understood that metallic tires although durable are not adapted to the requirements of motor trucks and that pneumatic tires are very costly and do not stand hard usage on heavy trucks and, so far as I am aware, no tire made resilient by mechanical means has been able to meet the requirements of use upon trucks.

In order to meet the above requirements and to avoid the objections to the various types of truck tires now in use, I have devised a tire consisting of relatively thin sections of resilient material lying with their flat sides in close contact and resting against a metallic rim, the outer edges of the sections comprising the tread of the tire.

In the accompanying drawing forming a part of this specification, Figure 1 is an elevation of my novel tire detached; Fig. 2 a cross sectional view on an enlarged scale; and Fig. 3 is an edge view of one of the tire sections.

10 denotes a metallic rim which serves as a backing for the sections 11 of resilient material. The sections are blanked out or otherwise formed to any required shape, for example—to substantially the form illustrated in Fig. 2, the tread being indicated by 12. In each edge of the sections I form inwardly and downwardly extending notches 13 which receive metallic retaining rings 14.

It will be noted from Fig. 3 that the sections when viewed edgewise taper from the tread inward, the lines of the sides being approximately radial; that is, part radii of a circle of which the tread of the tire is the periphery. The operation of tapering the sides of the sections may be performed by shaving or compressing the sections or in any suitable manner. The sections may be made of any suitable resilient material as vulcanized fiber, compressed paper or any of the various plastic compositions, or, if preferred, of leather, entirely satisfactory results being accomplished by the use of chrome tanned sole-leather seasoned with oil. This material produces a tread that is waterproof, exceedingly durable and not injuriously affected by heavily oiled roads. In assembling, the sections are passed outward between rings 14 with the rings lying on opposite sides of the tread and engaging the notches and then, by means of a former or in any suitable manner, the metallic rim is forced within the series of radially tapering sections in circular arrangement which form the tread and body of the tire. This crowds the inner portions of the sections outward against the rings, leaving that portion of the tire very hard, perfectly waterproof and solid on the rings. In order to render creeping of the tire upon the rings impossible, however, I additionally secure it by means of screws 15 which pass through holes in the rim and engage the sections.

Having thus described my invention I claim:

A tire comprising a series of transverse radial sections of resilient material having notches in their edges, retaining rings engaging the notches and a metallic rim of larger circumference than the normal inner circumference of the assembled sections whereby when assembled the bases of the series of sections are placed under longitudinal and radial compression.

In testimony whereof I affix my signature in presence of two witnesses.

DANIEL H. DEERY.

Witnesses:
A. M. WOOSTER,
S. W. ATHERTON.